United States Patent [19]

Lin

[11] Patent Number: 5,010,460
[45] Date of Patent: Apr. 23, 1991

[54] WATERSCAPE LAMP WITH SHADE OF PROXIMITY-CAPACITANCE-SENSING TYPE DEVICE

[76] Inventor: John Y. Lin, 1st Floor No. 12, Lane 179, Lee Shing Rd., Sec. 1, San Chung City, Taipei, Taiwan

[21] Appl. No.: 517,811

[22] Filed: May 2, 1990

[51] Int. Cl.[5] ............................................ F21V 23/04
[52] U.S. Cl. .................................. 362/101; 362/276; 362/395; 362/411; 362/802; 315/DIG. 4
[58] Field of Search ............... 362/101, 276, 395, 802, 362/806, 410, 411, 352; 200/600; 315/227 R, DIG. 4; 4/623; 307/116

[56] References Cited

U.S. PATENT DOCUMENTS

| | | | |
|---|---|---|---|
| 1,723,272 | 8/1929 | Emma | 362/101 |
| 1,788,058 | 1/1931 | Jyumi | 362/101 |
| 2,141,769 | 12/1938 | Simpson | 362/101 |
| 2,632,098 | 3/1953 | Marchese | 362/395 |
| 2,860,232 | 11/1958 | Gray | 362/101 |
| 3,435,205 | 3/1969 | Paul | 362/352 |
| 4,211,959 | 7/1980 | Deavenport et al. | 200/600 |
| 4,507,716 | 3/1985 | Benedict, Jr. | 362/410 |
| 4,527,225 | 7/1985 | Hartman | 362/413 |
| 4,723,080 | 2/1988 | Cline et al. | 307/116 |
| 4,751,625 | 6/1988 | Lin | 362/352 |
| 4,764,708 | 8/1988 | Roudeski | 307/116 |

FOREIGN PATENT DOCUMENTS

| | | | |
|---|---|---|---|
| 888532 | 9/1953 | Fed. Rep. of Germany | 362/352 |
| 516982 | 1/1940 | United Kingdom | 362/352 |

Primary Examiner—Ira S. Lazarus
Assistant Examiner—Richard R. Cole

[57] ABSTRACT

It is a no-touch lamp to be operated with a proximity-capacition-sensing circuit with lamp shade and waterscape-lamp stand; the lamp mainly comprises a lamp stand and lamp shade. when a person moves closely to the lamp, a signal will be generated, and will be amplified through a capacitance induction circuit so as to control the output of a Triac circuit and to turn on the lamp. The lamp stand is loaded with water and decorative objects, whereby a beautiful waterscape can be provided upon the power is turned on for visual pleasure.

3 Claims, 3 Drawing Sheets

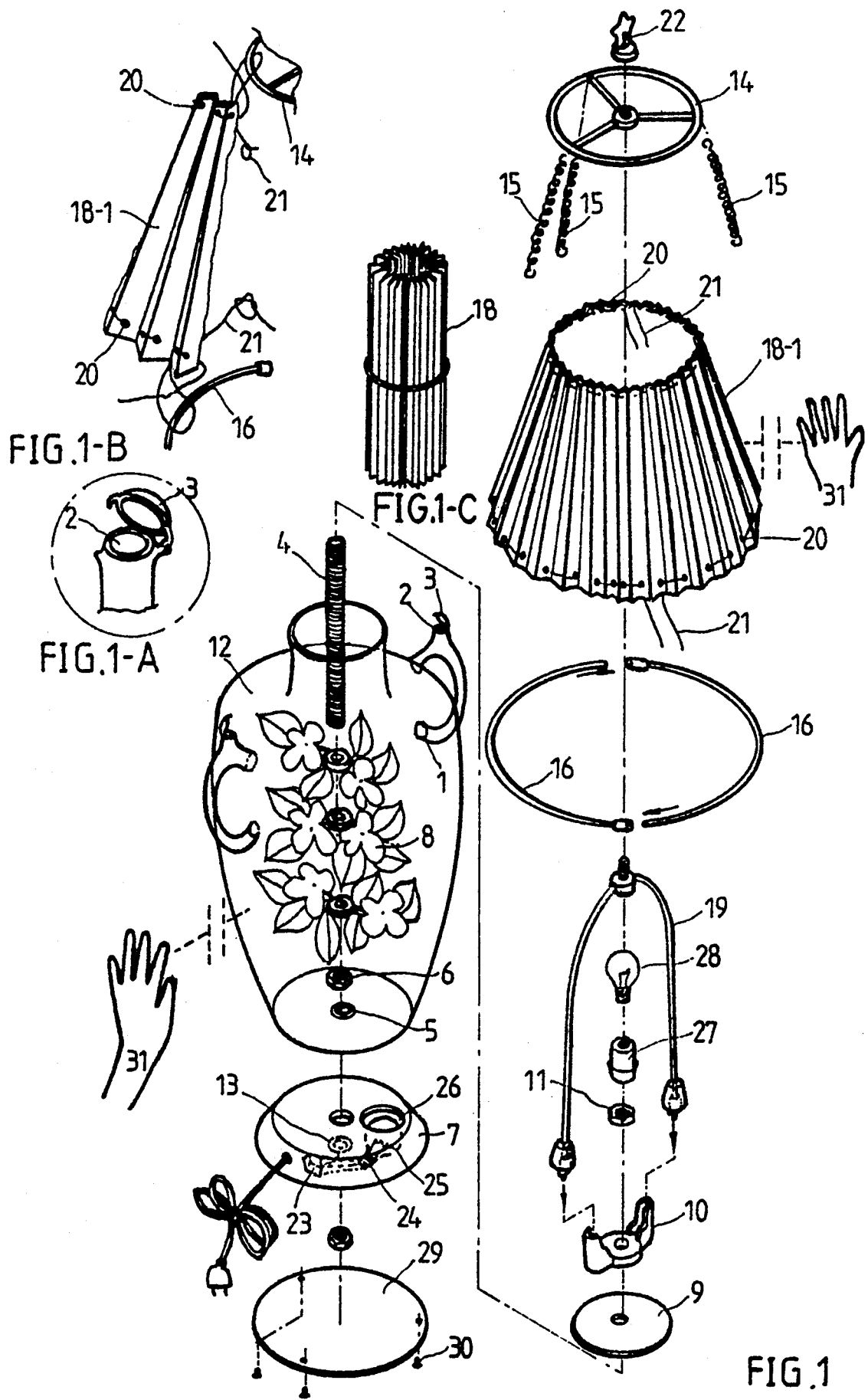

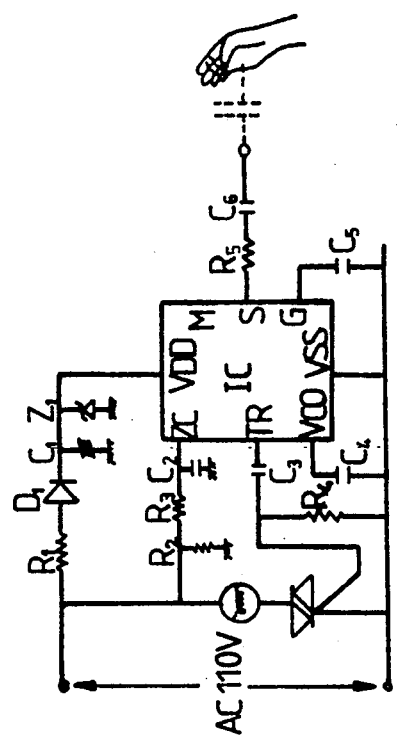
FIG. 3
FIG. 4
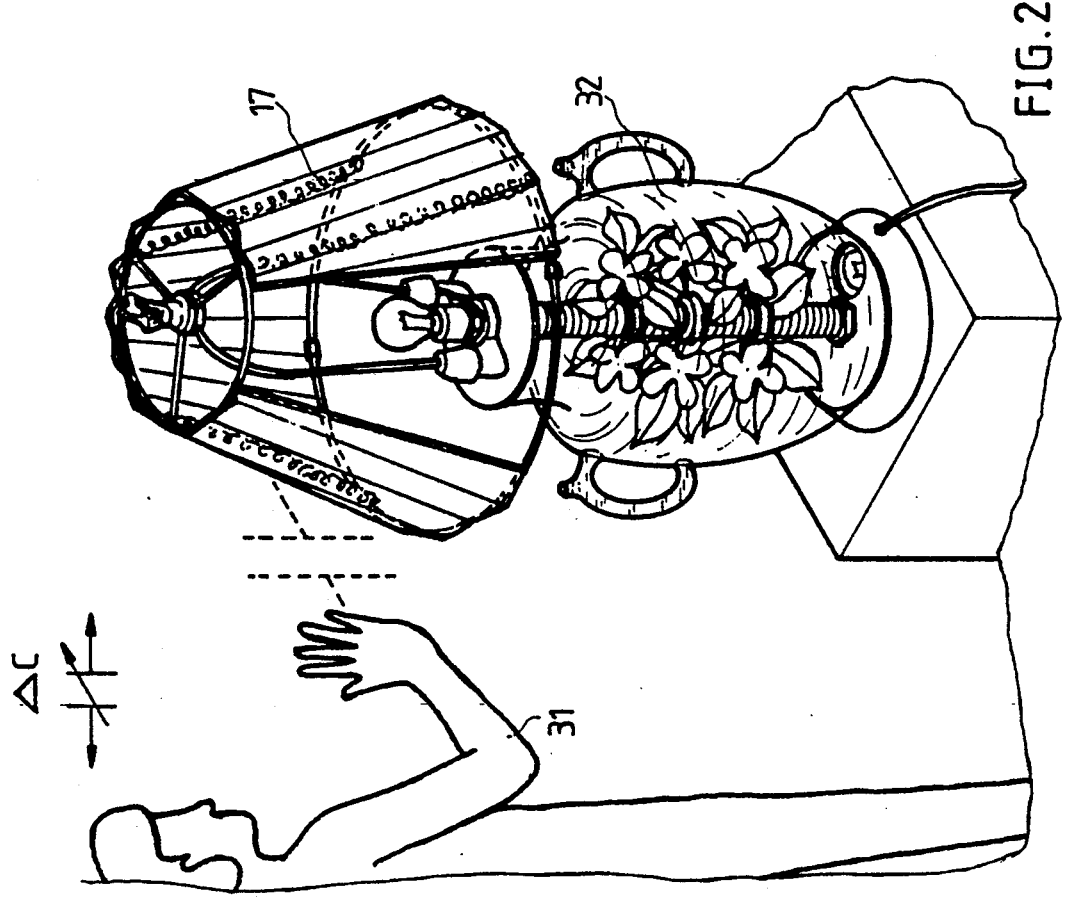
FIG. 2

WATERSCAPE LAMP WITH SHADE OF PROXIMITY-CAPACITANCE-SENSING TYPE DEVICE

BACKGROUND OF THE INVENTION

This invention is developed because that the inventor has discovered most of the conventional touch-control lamps having more or less leakage, i.e., it is possible to cause a shock upon a person touching the metal parts of a lamp. Moreover, most of the conventional table lamps have neither any waterscape feature, nor a conductive means made of water for transmitting signal. According to the present invention, when a person moves closely to the lamp, the brightness of the lamp can be controlled without actually touching the lamp; therefore, there will be no electric shock to take place.

The inventor has referred to some U.S. Pat. Nos. (4,751,625; 4,625,268; 2,810,066; 3,715,623; 2,632,098) and U.K. patent GB2098715A when designs the present invention; it has been found that none of the aforesaid patents shows the feature of the present invention; for instance, a water is used in the present invention as a conductor for transmitting signal to control the brigntness of a lamp. Moreover, a waterscape is also provided in the lamp stand, and a special designed high capacitance IC is used for controlling the operation of the present invention; therefore, the present invention is deemed a novel and practical lamp device.

SUMMARY OF THE INVENTION

This invention relates to a proximity - capacitance-sensing - type lamp device with waterscape; in the present invention, a lamp shade with some parts made of metal and water are used as parts part of the special IC circuit thereof. When a person moves near the lamp, a weak electric field will be generated between the two, the electric field will be converted into a capacitance to generate a signal; the signal is then amplified to control a power supply so as to regulate the brightness of the lamp.

The lamp shade of the present invention can be used for transmitting and receiving signal, and also can be assembled or disassembled easily so as to save packing space. The lamp stand is to be filled with water for transmitting and receiving signal, and also can provide a beautiful waterscape for the user; therefore, the present invention is deemed a novel and a practical lamp device.

BRIEF DESCRIPTION OF THE DRAWINGS

FIG. 1 is as disassembled view of an embodiment according to the present invention.

FIG 1-A is an enlarged view of the water intake as shown in FIG. 1.

FIG. 1-B is an enlarged view of a portion of the lamp shade as shown in FIG. 1.

FIG. 2 illustrates the capacitive effect in the present invention.

FIG. 3 illustrates the basic operation theory of the present invention in a cyclic manner.

FIG. 4 illustrates a circuit used in the present invention.

DETAILED DESCRIPTION

Figure 5:
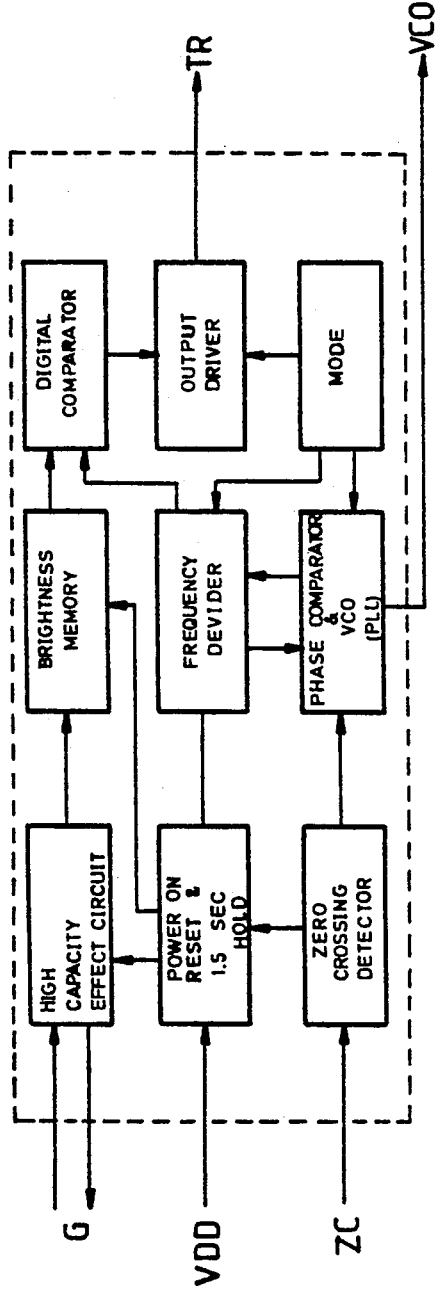
FIG. 5 is a block diagram of one IC used in the present invention.

In the conventional table lamps in the market, there is no lamp having water in the lamp stand to be used as a conductor to transmit signal; there is no lamp that whenever a person moves closely to the water inside the lamp stand, the brightness and on/off of the lamp can be controlled. In view of the such requirements, the inventor has developed the present invention.

Referring to FIG. 1, the table lamp according to the present invention comprises a lamp stand 1, which is substantially a transparent container; each of the two lug members on the upper portion of the lamp stand has a water intake 2 and a seal cap 3 as shown in FIG. 1-A. The lamp stand is fixedly mounted on a base block 7 by means of a metal pipe 4, a metal pad 5 and a water-tight rubber nut 6 to prevent from leaking water. Some decorative objects 8 are mounted on the metal pipe 4 so as to facilitate the decorative objects to be mounted inside the lamp stand 1; then, a water-tight lid 9 and a metal fixture 10 are fixed, by means of a nut 11, to the lamp stand 1. A clean water 12 is to be loaded through the water intake 2 into the lamp stand 1, and a seal cap 3 is used to seal the water intake tightly. Since the clean water is loaded inside the lamp stand, the whole lamp stand becomes a completely transparent member, and the decorative objects in the water can be seen clearly and beautifully. Since the metal pipe 4 is a conductor, and is placed in a conductive water 12, the pipe 4 can electrically be connected with the connector 13 and a switch to become a switch circuit of the lamp; the switch circuit includes actually the metal fixtures 10, a top ring 14, a metal nut 11, and several metal springs 15 mounted between the top ring 14 and the lower ring 16 to form into a circuit as shown in FIG. 2. The details of that circuit will be further described in the following by referring to FIGS. 2, 3, 4, 5, and 6. The lamp shade is detachable, and includes an insulated stretchable lamp shade 18 (able to be recovered into a slender member for packing), the top ring 14, the metal springs 15, the lower ring 16, a metal supporting frame 19 and the lamp stand 1; all the aforesaid parts can be packed into a box so as to reduce packing space. The lamp shade is to be opened into a stretched shade 18-1 when it is assembled with other related parts. The upper edge of the lamp shade has small hole 20 with string 21 as shown in FIG. 1-B so as to fasten the lamp shade to the top ring 14 through the small hole 20. The lower ring 16 is to be assembled with two halves. The lower edge of the lamp shade has small holes 20 with string 21 so as to fasten the lamp shade to the lower ring 16 though the small holes 20. There are several metal springs 15 to be mounted between the top ring 14 and the lower ring 16, and then a complete lamp shade is ready for further assembling steps. The metal supporting frame 19 is then mounted on the metal fixture 10, and the top ring 14 is mounted on the metal supporting frame 19 through a center hole on the top ring, and then the top ring is fixed in place with a nut 22. The base block 7 has a hollow space therein for mounting a circuit switch 23 and a bulb supporting member so as to mount a small socket 24 of a color small bulb 25. The light of the small bulb 25 can, through a light aperture, throw into the conductive water 12 and the decorative objects 8 inside the lamp stand 1 so as to provide a crystal-like and perspective ornament effect for looking pleasure. A pair of wires from the circuit switch 23 passed through the metal pipe 4, and is connected with a bulb socket 27 and bulb 28. A bottom plate 29 is fixedly attached to the base block 7 with small screws 30.

FIG. 2 illustrates the capacity effect of the circuit used in the present invention; a person's body is a good electrostatic conductor 31. When a person moves closely to the lamp at a distance about 12 mm (millimeters), a weak electric field will be generated, and that electric field is usually referred to as stray capacitance "$\Delta C$", of which the value ranges from several decade PF to several hundred PF. The variable electric field would generate a signal. When the distance between a person and the table lamp is less than 12 mm, the water induction face 32 and the metal induction face B 17 will generate a "$\Delta C$" to form a signal, which will be amplified and converted into a "$\Delta T$" (variable time value) to control a Triac "$\Delta \phi$" to generate a variable conduction angle; the "$\Delta \phi$" Triac will cause a power variation "$\Delta P$" to change the brightness of the lamp light.

FIG. 3 illustrates the operation steps of the circuit, i.e., "$\Delta C$"-"$\Delta T$"-"$\Delta \phi$"-"$\Delta P$"; the operation steps are to be done repeatedly. FIG. 5 illustrates the high capacity feature of the IC circuit, whereby the metal induction face 17 and the induction face 32 of the conductive water 12 are integrated into a single conductor. To operate the lamp according to the present invention, a user need not touch the lamp shade or lamp stand as shown in FIG. 2; in other words, the present invention has more safety and convenience to a user than the conventional lamp of the kind.

FIg. 4 illustrates a circuit used in the present invention, in which the line power is applied through R1, D1, C1, and Z1 to obtain a steady power supply of 10 volt for VDD of the IC. R2, R3, and C2 transfer line frequency into Zero Crossing circuit to convert the line power frequency 60 Hz or 50 Hz for the ZC of the IC. The output of C3 and R4 is used for controlling the Triac. C4 is connected With VCO of the IC. C5 is an input capacitor of IC. R5 and C6 are parts to receive sensing signal for of the IC.

Referring FIG. 5, illustrates a block diagram of the electronic operation according to the present invention. When the 10 V DC voltage is applied to terminal VDD a high capacitance will be transmitted to the conductive water 12, the induction face 32 and to the metal induction face 17 from Block 1 (high capacity effect) then the signal generated is amplified; at the same time, a 60 Hz signal is transmitted into Block 3 (Zero Crossing Detector) to detect the positive and negative crossing point of AC frequency so as to actuate the power on reset and 1.5 Sec. hold in Block 2 (power on reset & 1.5 Sec. hold), and to convert the line power frequency into a reference frequency to be transmitted to Block 6 (phase comparator & VCO "PLL") to make phase comparison; a basic frequency is generated to make a phase lock loop with the frquency of line power; then, a basic clock is generated with Block 5 (Frequency Divider). The clock can distinguish the time duration of a signal received; then, the clock is to Block 7 (Digital Comparator) to make a comparison, and then the clock is transmitted to Block 8 (Output Driver) to send out a pulse to control the lamp. The duration of the aforesaid operation is to be stored in Block 4 (Brightness Memory) to hold the time duration of a signal and the bulb brightness until a next signal being received. The aforesaid operation steps can be done repeatedly. The operation may be classified into there modes, i.e., (1) there would be no operation when the signal pulse time is less then 33 MS (milli-seconds); (2) it will operate only to hold memory about the brightness, when the signal pulse time is more than 33 MS and less than 333 MS (milli-seconds); (3) The brightness will change continuously, when the signal pulse time is more than 333 MS.

Figure 6:
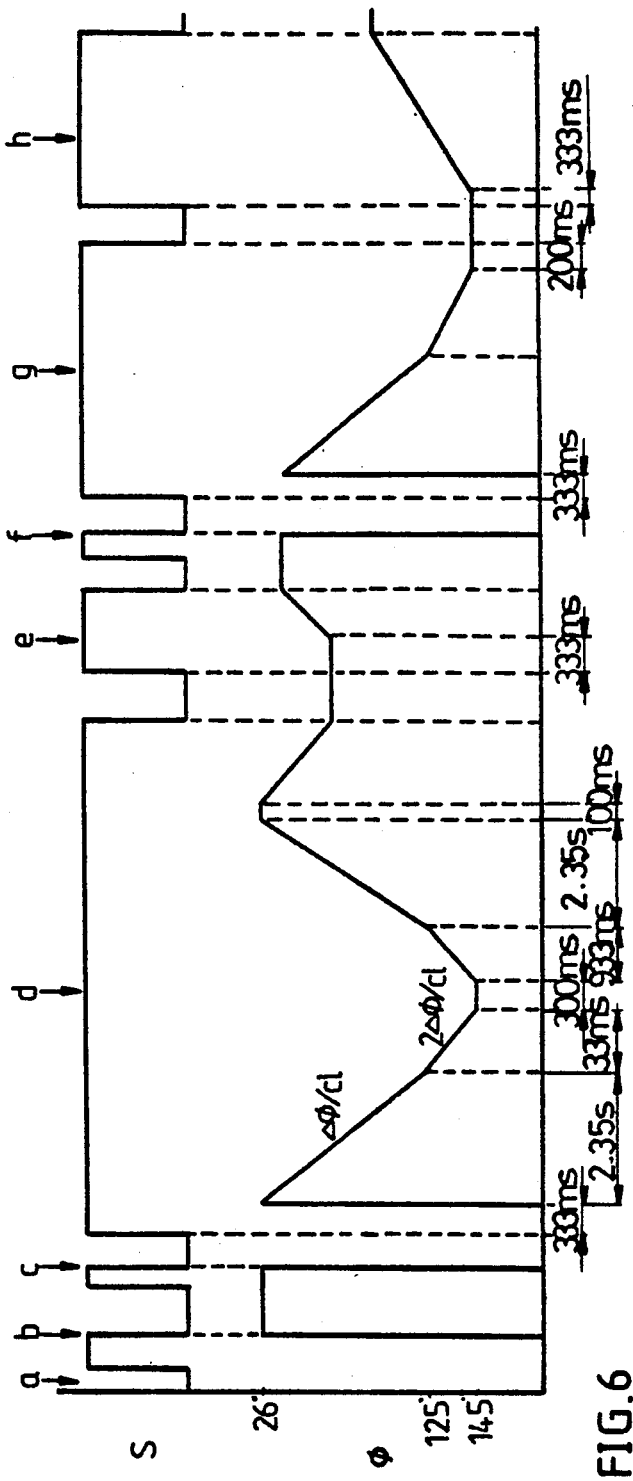
FIG. 6 is a time-control waveform diagram used in the present invention.

FIG. 6 illustrates the time control function in a cyclic manner, (the output phase angle and $\phi$ VS sensor input) in which (a) the output is in "off" condition when the power is turned on; (b) when a pulse less than 333 MS (milli-seconds) triggers the circuit at its descending edge (when a person moves away), the output is on, and the brightness is in the highest condition; (c) when a pulse is less than 333 MS, the output is off; (d) when a pulse is more than 333 MS, the output will occur during the 333 MS period, and the off condition will be changed to brightness memory (the highest brightness); then, the brightness is changed into dim condition; it changes into 125° within 2.35 Sec.; during that time period, it will change to 145° upon the clock changing one $\Delta \phi$; then, after every two clock $\Delta \phi$, The brightness will be maintained at 145° the most dim condition; after 0.3 Sec., the brightness will be increased in reverse steps; likewise, the brightness reaches the highest condition through two steps; after pausing 0.1 Sec., the dim condition will be increased further until the signal pulse becoming disappeared (the person moving away), and the brightness variation of the lamp will be discontinued. The brightness of the lamp will be maintained at the last brightness condition, which will be stored in the memory; (a) when another signal pulse over 333 MS is generated, the output will change during the 333 MS; in that case, the brightness will vary in reverse steps in comparison with the last operation, i.e., changing from dim to bright condition; (f) when a signal pulse less than 333 MS appears, the lamp is turned on to restore to its last bright condition, and then its brightness begins to change in reverse steps in comparison with the last time, i.e., changing from bright to dim condition; in other words, the variation direction of the brightness will not be affected by the signal pulse being less than 333 MS; the variation direction can only be changed upon a signal pulse being more than 333 MS, and the variation direction is contrary to that of last time. (g) and (h) can be the same as that of (d), (e), (f) (f) . . . etc. The aforesaid time is designed by using a 60 Hz time base; if a 50 Hz time base is used, the time should be multiplied with 1.2. Moreover, one thing should be pointed out that if the brightness is changed to the highest or lowest condition, and discontinued to change, the next signal pulse received being more than 333 MS will cause the brightness to change from the 333 MS, and the "hold" time would not continue.

As shown in FIG. 6 when the last signal pulse is in the most dim moment, the dim only holds 0.2 Sec.; then, the next signal pulse received after 333 MS will not hold for 0.1 Sec.; instead, the lamp will become bright upon the 333 MS starting. The continuous control scope would range from 9% to 95% (145°-26°). when the output is "off" upon power being turned on, the brightness memory is set in the most bright condition, i.e., 95%, and the most dim condition, i.e., 15%. when signal pulse becomes descending (i.e., the person moving away), the ON/OFF toggle operation will start.

In the present invention, a new high capacitance circuit is used so as to provide a close-space induction effect for varying the brightness of the lamp.

What is claimed:

1. A proximity-capacitance-sensing type lamp device with waterscape comprising:

a base block with a bottom plate underneath, having an IC mounted on the bottom side thereof, a center hole for mounting a metal pipe, a bulb socket to mount a small bulb, a light aperture at one side thereof, and a pair of power wires mounted through one side thereof;

a lamp stand being fixedly mounted on said base block by means of said metal pipe, a metal pad, and a water-tight rubber nut;

a suitable volume of conductive water, being used as a conductor to transmit a signal for controlling the brightness of the lamp device, filled in said lamp stand which is substantially a transparent container;

a lamp shade being mounted on a metal supporting frame; and a metal fixture being fixedly mounted to said metal pipe over said lamp stand.

2. A lamp device as claimed in claim 1, wherein said lamp stand is filled with a conductive water used as a conductor and several decorative objects to provide electric conduction and decorative features respectively.

3. A lamp device as claimed in claim 1, wherein both said lamp shade and said conductive water in said lamp stand each can be used as a capacitance induction circuit to generate a signal to be coupled into said IC so as to control the operation and brightness of said lamp device.

* * * * *